United States Patent [19]

Obe et al.

[11] Patent Number: 5,289,680
[45] Date of Patent: Mar. 1, 1994

[54] TWO PUMP HYDRAULIC SYSTEM WITH RELIEF VALVES HAVING DIFFERENT RELIEF PRESSURES

[75] Inventors: Mitsuhiko Obe; Hironobu Kubota, both of Sakai, Japan

[73] Assignee: Kubota Corporation, Osaka, Japan

[21] Appl. No.: 666,785

[22] Filed: Mar. 8, 1991

[30] Foreign Application Priority Data

Mar. 9, 1990 [JP] Japan .................. 2-59605
Mar. 9, 1990 [JP] Japan .................. 2-59606

[51] Int. Cl.⁵ .............................. F16D 31/02
[52] U.S. Cl. ........................ 60/422; 60/421; 60/429; 60/468
[58] Field of Search ............ 60/421, 422, 429, 430, 60/433, 468, 484, 486; 91/6, 532; 417/287, 288, 268, 428

[56] References Cited

U.S. PATENT DOCUMENTS

| B 535,386 | 1/1976 | Eftefield | 60/430 X |
|---|---|---|---|
| 3,148,506 | 9/1964 | Moyer et al. | 60/429 X |
| 3,535,877 | 10/1970 | Becker et al. | 60/421 X |
| 3,760,689 | 9/1973 | Johnston | 60/421 X |
| 3,994,133 | 11/1976 | Pfeil et al. | 60/468 X |
| 4,141,280 | 2/1979 | Lorimor | 60/486 X |
| 4,204,405 | 5/1980 | Basham | 60/430 X |
| 4,305,571 | 12/1981 | Hystad | 60/486 X |
| 4,355,693 | 10/1982 | Hirooka et al. | 60/484 X |
| 4,367,624 | 1/1983 | Ogata et al. | 60/486 X |
| 4,422,290 | 12/1983 | Huffman | 60/430 X |
| 4,516,467 | 5/1985 | Keeney et al. | 91/6 X |
| 4,819,430 | 4/1989 | Becker | 60/430 X |

FOREIGN PATENT DOCUMENTS

| 0108347 | 5/1984 | European Pat. Off. |
| 62-31166 | 2/1987 | Japan . |
| 925437 | 5/1963 | United Kingdom . |
| 1222104 | 2/1971 | United Kingdom . |
| 1313876 | 4/1973 | United Kingdom . |
| 1492155 | 11/1977 | United Kingdom . |
| 1580961 | 10/1980 | United Kingdom . |
| 1580777 | 12/1980 | United Kingdom . |

Primary Examiner—Edward K. Look
Assistant Examiner—John Ryznic
Attorney, Agent, or Firm—Gifford, Groh, Sprinkle, Patmore and Anderson

[57] ABSTRACT

A hydraulic circuit for a working vehicle comprising a first pump, a second pump, a first actuator, a second actuator, and a selector valve having a plurality of control positions. The selector valve is switchable between a first position for connecting the first pump to the first actuator and the second pump to the second actuator, and a second position for connecting the first pump and the second pump to the second actuator. This circuit includes a first relief valve disposed between the selector valve and the first pump, and a second relief valve disposed between the selector valve and the second pump. The first relief valve is set to a higher relief pressure than the second relief valve.

3 Claims, 2 Drawing Sheets

TWO PUMP HYDRAULIC SYSTEM WITH RELIEF VALVES HAVING DIFFERENT RELIEF PRESSURES

BACKGROUND OF THE INVENTION

1. Field of the Invention

The present invention relates to a hydraulic circuit for a working vehicle having a plurality of actuators and a plurality of hydraulic pumps.

2. Description of the Prior Art

A tractor, for example, has, besides a hydraulic device (main actuator) for raising and lowering a working implement attached rearwardly, a hydraulic device (auxiliary actuator) for actuating a cane cutter or a grass cutter and a loader implement. The respective actuators receive pressure oil from two hydraulic pumps driven by an engine.

The auxiliary actuator is interchangeable. When the loader implement is used, for example, it is possible to shorten a cycle time by increasing oil supply. A greater quantity of oil may be required in this case than when the cane cutter or the like is used. However, this requirement is not met since the pump for driving the auxiliary actuator provides a fixed displacement.

It is relatively easy to supply the oil discharged from the main actuator confluently with the oil from the auxiliary actuator. However, oil lines extending to the respective actuators include relief valves. Where the two relief valves have the same relief pressure, the confluence of the oils from the two pumps may cause resonance of the relief valves and produce chattering sounds. Thus, the oils cannot simply be joined to meet the above requirement.

Various hydraulic devices have approximately the same relief pressure and to increase the relief pressure for certain hydraulic devices impairs flexibility. On the other hand, the relief pressure may be freely selected for the hydraulic implements of the tractor to which the above hydraulic devices are applied. It is known that a high system pressure enables compact designing.

SUMMARY OF THE INVENTION

An objective of the present invention to provide a hydraulic circuit free of chattering, which includes a selector valve mounted on oil lines connecting a plurality of pumps to a plurality of actuators for switching between a mode for supplying pressure oil separately to the respective actuators and a mode for supplying pressure oil confluently to one of the actuators.

The above objective is fulfilled, according to the present invention, by a hydraulic circuit for a working vehicle comprising: a first pump; a second pump; a first actuator; a second actuator; a selector valve having a plurality of control positions, the selector valve being switchable between a first position for connecting the first pump to the first actuator and the second pump to the second actuator, and a second position for connecting the first pump and the second pump to the second actuator; a first relief valve disposed between the selector valve and the first pump; and a second relief valve disposed between the selector valve and the second pump; wherein the first relief valve is set to a higher relief pressure than the second relief valve.

According to this construction, when the selector valve is switched to the first position, pressure oils from the first and second pumps flow separately to the first and second actuators. When the selector valve is switched to the second position or confluence position, the pressure oils from the first and second pumps flow confluently to the second actuator. With the increased quantity of pressure oil supply, the second actuator operates a loader implement or the like with high efficiency. At this time, the pressure oils flow to the first and second relief valves simultaneously. However, the first relief valve having a higher relief pressure than the second relief valve does not operate. Since only the second relief valve operates, no resonance is produced.

In a preferred embodiment of the present invention, the selector valve is further switchable to a third position for connecting the first pump to the second actuator and the second pump to the first actuator.

With this construction, where the two pumps are different in performance, a pump having the higher performance may be selected for connection to an appropriate one of the actuators.

Other objects and features of this invention will be understood from the following description made with reference to the accompanying drawings.

DETAILED DESCRIPTION OF THE PREFERRED EMBODIMENTS

Embodiments of the present invention will be described hereinafter with reference to the drawings.

Figure 1:
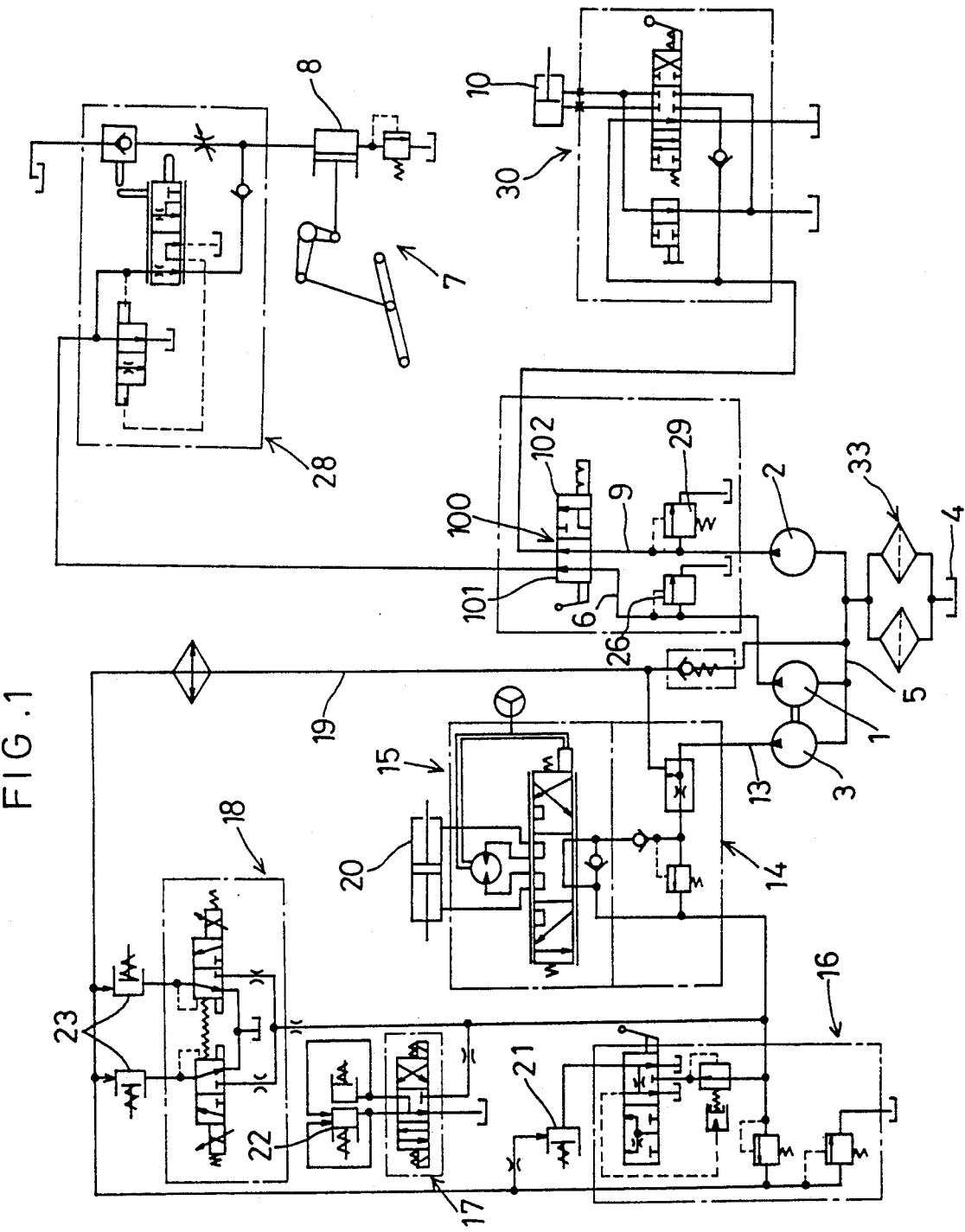
FIG. 1 is a hydraulic circuit in a first embodiment of the present invention.

FIG. 1 shows a hydraulic circuit for a tractor having actuators which control implements attachable to the tractor such as a front loader, a cane cutter, a grass cutter, a rotary plow, and a lift.

Numerals 1, 2 and 3 in FIG. 1 denote pumps driven by a tractor engine to draw lubricating oil from an oil tank 4 defined by a transmission case and to supply the oil under pressure to actuators provided inside and outside a tractor body.

The first pump 1 is connected through a first oil line 6 to a cylinder, i.e. a first actuator (main actuator) 8, to control a hydraulic device 7 for raising and lowering a working implement attached rearwardly of the tractor. The second pump 2 is connected through a second oil line 9 to a cylinder or second actuator (auxiliary actuator) 10 such as a hydraulic motor to control an external hydraulic mechanism.

The third pump 3 has a supply oil line 13 connected to a priority valve 14, a power steering valve 15, a PTO change speed valve 16, a double speed change valve 17, and a backward/forward changeover valve 18.

The pressure oil discharged from the third pump 3 is supplied primarily to the power steering valve 15, with part of the oil flowing into a return oil line 19, whereby a power steering cylinder 20 is operated. After the steering valve 15, the pressure oil is supplied to the PTO change speed valve 16 to operate a PTO change speed hydraulic clutch 21, and to the double speed change valve 17 to operate a hydraulic clutch 22 for a change speed device that drives front wheels of the tractor at twice the speed of rear wheels. In parallel therewith, the pressure oil is supplied to the backward/forward changeover valve 18 to operate a backward/forward changeover hydraulic clutch 23. After the PTO change speed valve 16 and backward/forward changeover valve 18, the pressure oil flows through the return oil line 19 back to the oil tank 4.

The first oil line 6 extending from the first pump 1 includes a relief valve 26, a two-position selector valve 100 and a draft control valve 28. The second oil line extending from the second pump 2 includes a relief valve 29, the two-position selector valve 100 and an auxiliary control valve 30.

The two-position selector valve 100 communicates with the two oil lines 6 and 9 and has a separating position 101 and a confluence position 102. The separating position 101 maintains the two oil lines 6 and 9 in a separate or independent mode in which the first pump 1 is connected to the first actuator 8, and the second pump 2 to the second actuator 10. The confluence position 102 connects both the first and second pumps 1 and 2 to the second actuator 10 to supply a large quantity of oil confluently thereto.

The two relief valves 26 and 29 have different relief pressures. The relief valve 26 for the first actuator 8 has a higher relief pressure than the relief valve 29 for the second actuator 10. For example, the relief valve 29 is set to 180 kg/cm$^2$, and the relief valve 26 to 200 kg/cm$^2$.

When the pressure oil from the first and second pumps 1 and 2 is supplied confluently to the second actuator 10, the relief pressure becomes 180 kg/cm$^2$ to operate only the relief valve 29. No chattering is produced in the absence of resonance since the relief valve 26 does not operate at this time. By setting a high relief pressure for the relief valve 26, it is possible to increase the operating power of the first actuator 8 or to reduce the size thereof. Numeral 33 in FIG. 1 denotes oil filters.

Figure 2:
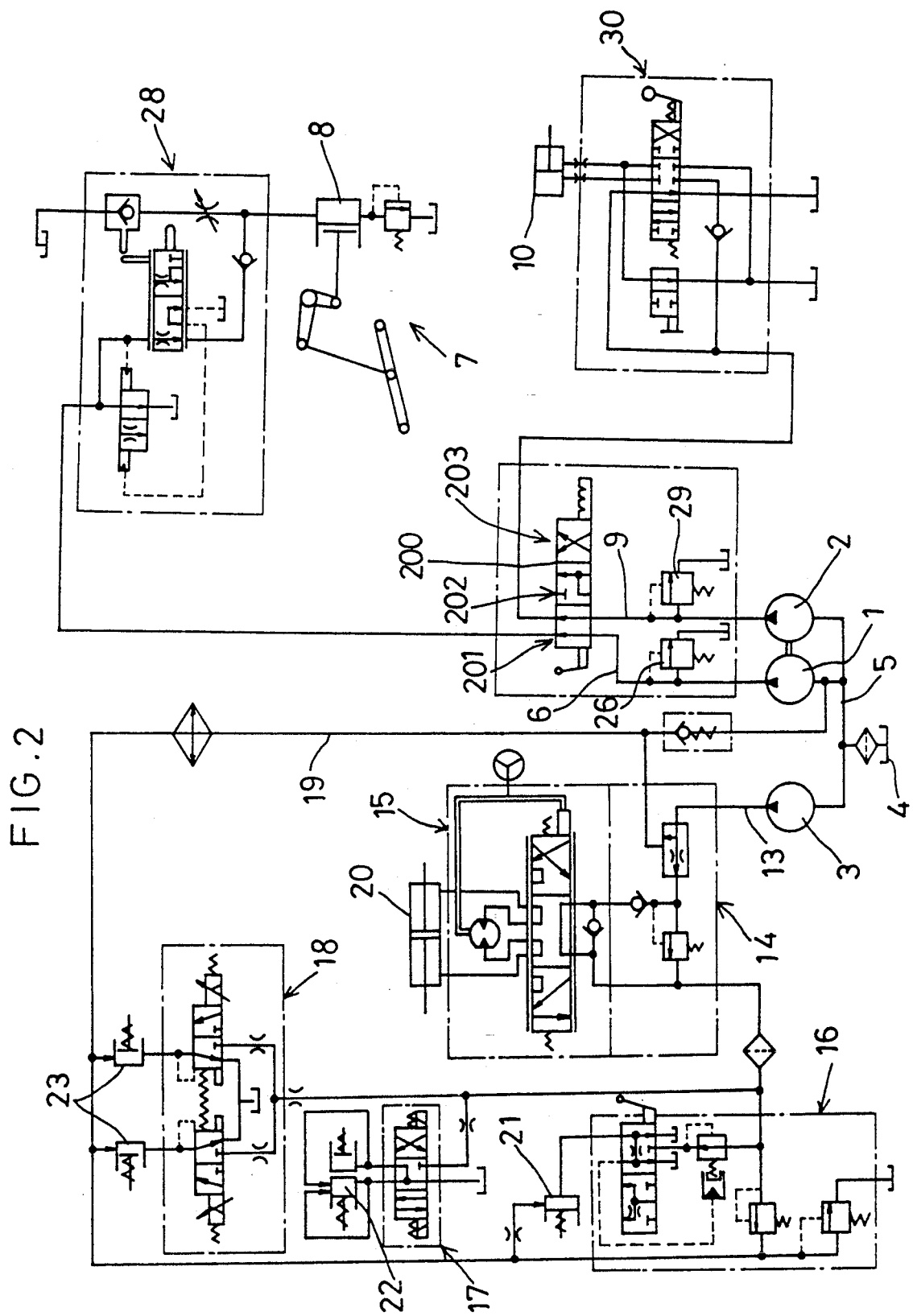
FIG. 2 is a hydraulic circuit in a second embodiment of the present invention.

FIG. 2 shows a second embodiment of the present invention. The hydraulic circuit in this embodiment differs from the described hydraulic circuit in that a three-position selector value is used in place of the two-position selector valve. To avoid repetition, like parts are labeled with like reference numerals with respect to the foregoing embodiment and are not particularly described again.

The first oil line 6 extending from the first pump 1 includes a relief valve 26, a three-position selector valve 200 and a draft control valve 28. The second oil line extending from the second pump 2 includes a relief valve 29, the three-position selector valve 200 and an auxiliary control valve 30.

The three-position selector valve 200 communicates with the two oil lines 6 and 9 and has a separating position 201, a confluence position 202 and an exchange position 203.

The separating position 201 maintains the two oil lines 6 and 9 in a separate or independent mode in which the first pump 1, which is a large displacement pump, is connected to the first actuator 8, and the second pump 2, which is a small displacement pump, to the second actuator 10.

The confluence position 202 connects both the first and second pumps 1 and 2 to the second actuator 10 to supply a large quantity of oil confluently thereto.

The exchange position 203 connects the first pump 1 to the second actuator 10 and the second pump 2 to the first actuator 8, whereby quantities of oil supplied are reversed with respect to the separate mode.

The separating position 201 is applicable where a small capacity working implement such as a cane cutter or a hydraulically operable grass cutter is controlled by the second actuator 10. The exchange position 203 is applicable where a front loader is controlled by the second actuator 10, with the hydraulic device 7 infrequently used or allowed to operate at a low rate under control of the first actuator 8. The confluence position 202 is applicable where the front loader is operated at high speed, e.g. a bucket cylinder and a boom cylinder are operated simultaneously, to shorten a cycle time.

As in the preceding embodiment, the relief valve 26 preferably has a higher relief pressure than the relief valve 29. However, the two relief valves 26 and 29 may have the same relief pressure to secure only the characteristic of the three-position valve, namely the pump exchange characteristic.

What is claimed is:

1. A hydraulic circuit for delivering pressurized fluid to a working vehicle comprising:
    a first pump;
    a second pump;
    a first actuator;
    a second actuator;
    a selector valve being switchable between a first position for connecting said first pump to said first actuator and said second pump to said second actuator, and a second position for connecting said first pump and said second pump to only said second actuator;
    a first relief valve disposed between said selector valve and said first pump, said first relief valve having a first predetermined relief pressure;
    a second relief valve disposed between said selector valve and said second pump, said second relief valve having a second predetermined relief pressure; and
    said first predetermined relief pressure of said first relief valve having a higher relief pressure than said second predetermined relief pressure of said second relief valve;
    whereby resonance chattering produced by the opening and closing of said first and second relief valves is avoided.

2. The hydraulic circuit as claimed in claim 1, wherein said selector valve is further switchable to a third position for connecting said first pump to said second actuator and said second pump to said first actuator.

3. The hydraulic circuit as claimed in claim 2, wherein said first pump is formed as a large displacement pump, and said second pump as a small displacement pump.

* * * * *